Jan. 31, 1961 S. C. ROCKAFELLOW 2,970,205
ELECTRICAL CIRCUIT
Filed Oct. 1, 1958 2 Sheets-Sheet 1

INVENTOR.
STUART C. ROCKAFELLOW
BY
Woodhams Blanchard and Flynn
ATTORNEYS

INVENTOR.
STUART C. ROCKAFELLOW
BY
Woodhams Blanchard of Flynn
ATTORNEYS.

United States Patent Office 2,970,205
Patented Jan. 31, 1961

1

2,970,205

ELECTRICAL CIRCUIT

Stuart C. Rockafellow, Plymouth, Mich., assignor to Robotron Corporation, Detroit, Mich., a corporation of Michigan Filed Oct. 1, 1958, Ser. No. 764,571

5 Claims. (Cl. 219—108)

This invention relates to electrical welding controls and particularly to a circuit for initiating a plurality of electrical functions in timed relationship to each other with a high degree of accuracy.

In connection with the development of uses for plastic coated metal sheets or panels during the past several years, there has been presented to the industry a perplexing problem of devising means for securing such sheets or panels to other metal parts without damaging the plastic layer. Particularly, this problem includes the fastening of various tabs, brackets, angles and other bolt or screw receiving devices to the uncoated side of such plastic coated sheets or panels. The well-known techniques of those welding operations, as resistance welding, which would normally be employed for securing uncoated metal parts together are not suitable, as conventionally performed, for use on plastic coated metals because the plastic layer is an effective insulator and thus prevents the flow of electrical current therethrough.

A further problem of welding plastic coated metal sheets and panels lies in the relatively low decomposition or softening temperatures of the plastics, such as various ones of the vinyls, with which metals are commonly coated. Thus, if heat sufficient to soften substantial amounts of the metal for welding purposes if applied thereto, this heat will usually be sufficient to severely damage the plastic layer. Inasmuch as the plastic layer is generally used for either decorative or protective purposes, such damaging of the plastic coating is unacceptable and must be avoided.

It has been previously suggested to perform a welding operation in which both welding electrodes are placed on the same side of the sheet or panel and press the work against a suitable back-up plate. One electrode, which is in contact with the sheet or panel and is slight displaced from the point at which the weld is desired, is of sufficiently large area that the density of the current passing from the said electrode to the sheet or panel is low enough that no appreciable heating of the sheet or panel occurs. The other electrode, which is applied to the other piece, such as a tab, at the point at which the welding thereof to the sheet or panel is desired, contacts the work over a sufficiently small area that the current density at this point is high enough to cause heating effective to soften the metal and effect a weld.

It was discovered that if the pulse of electrical energy applied to the parts to be welded together following the afore-mentioned welding techniques was of extremely short duration, the heating effect thereof was localized enough to effect the necessary softening of the metal for welding purposes before the heat dissipated materially into the surrounding metal. Further, it was found that be effecting a pulse of extremely short duration, there was such a small quantity of total heat developed that when said heat had dissipated into the surrounding metal the temperature of the metal remained low enough that the plastic material adhering thereto was not harmed. This type of welding operation, however, requires that the pulse be extremely accurately timed since its extremely short duration necssitates that the commencement thereof be extremely accurately related to the application of pressure to the work in order to obtain a satisfactory weld.

2

While the actual duration of the pulse will depend upon the thickness and composition of the metal being welded, it will in all cases be of extremely short duration. It has been found that the welding pulse should not exceed from 2 to 4 milliseconds in duration, that is, a duration of not over approximately one-quarter cycle of commercially available 60 cycle alternating potential. This extremely short period presents an entirely different problem in timing as compared with the more conventional resistance welding controls wherein welding periods of from 5 to 10 cycles are utilized. It is evident that where a precisely controlled weld time period of one-quarter cycle or less is involved, it is not sufficiently accurate to effect the timing function by means which utilize the wave form of the alternating current source to determine and control the timing function.

Therefore, the objects of the invention include the following:

(1) to provide an improved electrical timing and control circuit capable of initiating at least two electrical functions with a high degree of accuracy with respect to each other;

(2) to provide an improved timing and control circuit, as aforesaid, which is applicable to electrical resistance welding operations wherein the entire duration of the welding pulse is of order materially less than one cycle in extent;

(3) to provide an improved timing and control circuit, as aforesaid, which can be readily adjusted for welding operations involving different compositions and thicknesses of metal;

(4) to provide an improved timing and control circuit, as aforesaid, which is of sufficiently rugged character as to be acceptable for use with resistance welding equipment under normal factory operating conditions;

(5) to provide an improved timing and control circuit for resistance welding equipment, as aforesaid, which is readily adaptable to the initiation of two or more timing functions at precisely controllable intervals;

(6) to provide an improved timing and control circuit, as aforesaid, which operation can be initiated as desired by manual or mechanical controls or other electrical circuitry;

(7) to provide an improved timing and electrical control circuit, as aforesaid, which is sufficiently simple that it will be economical to manufacture and which will be sufficiently sturdy that it will be economical to maintain in accurate operating condition; and (8) to provide an improved process of welding particularly adapted for welding metal parts to plastic coated metal sheets and panels.

Other objects and purposes of the invention will be apparent to persons acquainted with devices of this general type upon reading the following disclosure and inspecting the accompanying drawings.

*General description*

Figure 1:
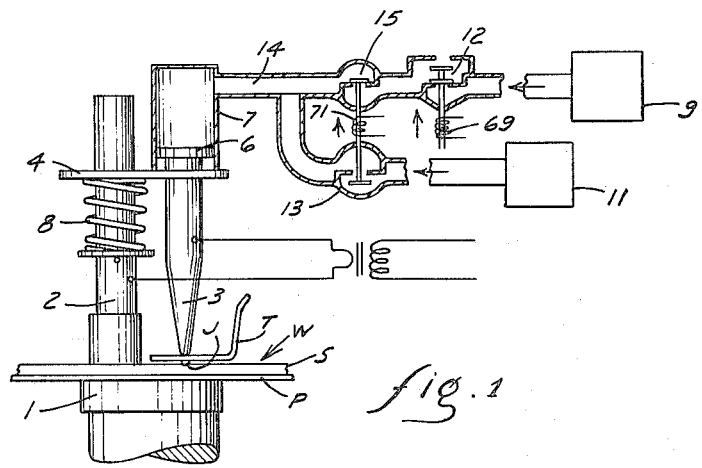
Figure 1 is a schematic view of welding equipment utilizing and illustrating the invention.

The invention provides an improved method for welding a metal element, such as a tab or bracket, to a metal sheet or panel having a heat sensitive plastic coating on one surface thereof. The metal element is provided with a projection which is adapted to be placed in contact with the uncoated surface of the sheet or panel so as to maintain the main body of the metal element spaced from the sheet or panel. One welding electrode having a large contact surface area is placed against the uncoated surface adjacent the projection and is urged against the sheet. A second welding electrode having a small contact surface area is placed against said metal element preferably so that it is at least in part received within said projection. The second welding electrode is urged toward the sheet and, thus, urges the projection against the uncoated surface thereof. A pulse of electrical energy is passed between the electrodes for a period of time not exceeding about 4 milliseconds, the pulse passing from the large area electrode through the metal of the sheet, through the projection and the metal element to the small area electrode. This concentrates the welding heat within the projection and the metal of the sheet immediately adjacent thereto.

The projection collapses very fast because of the large amount of heat imparted thereto in a short time and it will usually be necessary to maintain such pressure of the welding electrode having the small contact area that it will immediately follow-up any collapsing of the projection and thus maintain sufficient pressure thereon to achieve a proper weld. It has been found to be particularly satisfactory to effect the flow of welding current while the pressure exerted on the small area welding electrode is being increased in order to obtain the desired follow-up movement of the electrode. However, the timing for application of weld current with respect to the increasing pressure is very critical because, if the pressure increases too much without weld current flow, the projection may be flattened and, when the weld current finally flows, there may be too much of an area of contact between the metal element and the sheet to produce a good weld under the welding conditions discussed above. The increase of pressure on the small area welding electrode may be brought about by application of magnetic force in a manner similar to that disclosed in my copending application Serial No. 660,320, but magnetic force welding requires special rather expensive equipment. Fluid pressure, such as air pressure, may also be used to effect the desired increase in pressure on the small area welding electrode.

It is usually satisfactory to flow pulses of welding energy of only one polarity through the welding transformer and such is desirable since it simplifies the circuit for supplying welding energy. However, repetitive flow of pulses of welding energy of only one polarity through the welding transformer tends to saturate the transformer and, therefore, the invention provides for flowing small pulses of current of the opposite polarity through the welding transformer between successive pulses of welding current in order to reset the flux in the transformer to about zero between welds.

The invention also includes electrical circuitry for effecting the necessary supply of current to the welding transformer and performing the necessary timing operations by (a) starting a plurality of timing functions simultaneously and utilizing the timing out of each thereof to effect the several required further functions, and (b) utilizing a D.C. potential in conjunction with an A.C. potential in such a manner that the time sensitive means will be enabled to operate in response to the D.C. potential applied immediately upon the timing out of the timing means rather than awaiting the application of the next half-cycle as is the case with conventional A.C. actuated timing apparatus. Thus, even though the pulses from which the welding current is derived and the pulses by which the pressure on the welding electrode is caused, or at least initiated, are the result of A.C. potential, it is still possible to effect timing functions between the peaks of said alternating potential and thereby effect exact timing within a range of accuracy of a few milliseconds.

*Detailed description*

Since the process aspects of the invention will be readily understood by reference to a specific apparatus by which said process may be practiced, the description of the invention will proceed with the description of the specific apparatus. It will be clearly understood that such apparatus is, insofar as the process is concerned, described for illustrative purposes only and it will be possible for the process to be practiced by a variety of other particular instrumentalities.

Further, with respect to the apparatus aspects of the invention, certain specific illustrative time relationships will be described but it will be recognized that these also are for illustrative purposes only and are not to be considered as limiting.

Referring now to the drawings, in Figure 1 there is shown, somewhat schematically, certain specific apparatus by which the invention may be practiced. In this figure there is shown the work W consisting of a steel sheet S of about .030 inch thickness covered on one side by a layer of vinyl plastic P of approximately .015 inch thickness. It is desired to weld a metal tab T onto the steel sheet S. The tab T is provided with a projection J.

The work W is supported by a back-up plate 1 of relatively large size and the electrodes 2 and 3 are positioned for engagement with the work in the manner shown. The electrode 2 has a sufficiently large area in contact with the sheet S that the density of the current which flows therethrough is small enough that no appreciable heat develops in the sheet adjacent thereto. On the other hand the electrode 3 has a somewhat conical tip which provides a sufficiently small area in contact with the tab T that, together with the projection J, the current density through the projection and the portion of sheet S adjacent thereto will be large enough to cause the necessary heating of said projection and the metal of sheet S adjacent thereto to cause a welding thereof in the usual manner already familiar in connection with projection welding practice. The larger electrode 2 slidably extends through a suitable support structure 4 and is urged downwardly into contact with the sheet by a spring 8. The electrode 3 is also slidable through the support structure 4 and is connected to a piston 6 which is vertically and slidably supported within the pressure cylinder 7, said pressure cylinder being mounted on said support structure. The larger electrode 2 is here shown as extending slightly below the tip of the small electrode 3 so that the sheets and tab T are held in proper position with respect to each other. However, it will be apparent that this orientation of the electrodes may be changed as necessary for handling sheets and tabs of different shape.

While any suitable pressure creating means may be utilized within the pressure cylinder 7, the following description will proceed in terms of utilizing air pressure inasmuch as air pressure is much more rapid in operation than is hydraulic pressure and it is normally available in industrial plants. Further, utilizing air pressure normally requires less expensive mechanism than does the employment of either magnetic or hydraulic devices. However, it should be clearly understood that the use of air pressure is employed here strictly for illustrative purposes and its employment for such purposes is in no sense limiting.

Accordingly, there is shown a source 9 of low, as 20 p.s.i., pressure air and a source 11 of high, as 40 p.s.i., pressure air, it being understood that these may be either separate sources as indicated in the drawing or the same source with one outlet suitably throttled for providing the desired low pressure supply. These sources are connected through D.C. operated solenoid valve mechanisms 12 and 13 to a conduit 14 which in turn is connected to the cylinder 7. The low pressure valve 12 will normally be a three-way valve, one of the ports thereof being connected to atmosphere so that when communication between source 9 and conduit 14 is blocked, the portion of conduit 14 adjacent thereto will be connected to atmosphere. The valve 13 is normally merely an on-off valve which will not exhaust to the atmosphere but which will be merely open or closed. The valve 13 includes a valve element 15 in conduit 14 for blocking communication thereof with valve 12 when valve 13 is open.

A two-valve system is utilized in the present embodiment in order to avoid the unduly long time delay in opening and closing thereof which is normally involved in commercially available single valves, with which I am familiar, capable of performing the same operations. It will be recognized, of course, that if a valve of sufficient capacity to fill the pressure cylinder 7 within the desired short period of time is available, and it is sufficiently rapidly acting for the purposes of the invention, then such a single valve can be employed satisfactorily and is within the scope of the invention.

The point of maximum pressure on the electrode 3 should be reached in a definitely timed relationship with respect to the initiation of current flow and it has been found desirable to effect flow of welding current while the pressure on said electrode is rising and preferably at a point slightly before maximum pressure is reached. It has been found with commercially available valves, with which I am familiar, that the valves will each operate such that the maximum pressure from the respective sources will be developed in the pressure cylinder 7 and the pressure will be translated mechanically from the pressure cylinder 7 to the tip of the small electrode 3 within a period of not more than about 50, usually 40–50, milliseconds following the application of electrical actuating energy to the respective valves.

Thus, in the present embodiment, for the successive operation of the two valves 12 and 13, there should be allowed a total time interval of about 100 milliseconds between the time of energization of the control circuit for the valves and the flow of welding current. The source voltage for the welder is normally commercially available 60 cycle A.C. and it is convenient to start timers for controlling the actuation of valves at a given point with respect to the wave form thereof, such as at a zero point. Inasmuch as six cycles of commercial A.C. equals 100 milliseconds, the invention provides a time period of 100 milliseconds within the timing functions are carried out. If it should be possible to utilize valves whose total operating times safely total less than 83⅓ milliseconds, say 75 milliseconds, then a time period equal to 83⅓ milliseconds (5 A.C. cycles) could be used. However, in any event, it is preferable to establish the total time for operating the valves in terms of integral numbers of A.C. cycles.

Therefore, with the line 21 selected as the starting point for the timing function, a line 22 spaced therefrom by six cycles or 100 milliseconds of time indicates the time provided for the operation of the valves and, therefore, the time required for the desired pressurizing of the electrode 3. Line 22 indicates the beginning of the half-cycle during which the pulse of weld current flows. It is assumed in this example that to obtain a welding pulse of the proper magnitude, the pulse is to start six milliseconds following the commencement of the half-cycle which commences at the time indicated by line 22. Further, it is assumed that the valve 13 associated with the high pressure line requires 47 milliseconds, which is a typical value, from the time its operation is initiated until pressure on the electrode 3 builds up to the desired value. Therefore, initiation of operation of valve B will commence at the time indicated by line 23 which is 41 milliseconds ahead of the point in time represented by the line 22. Further, it is here assumed that the valve 12 associated with the low pressure line requires 48 milliseconds from the time its operation is initiated until the pressure on electrode 3 reaches the desired value. Therefore, the valve 12 is actuated 48 milliseconds ahead of the point in time represented by the line 23, namely, at the time indicated by the line 24. The time indicated between lines 21 and 24, in this example 11 microseconds, represents the delay between the starting of the timing function and actuation of valve 12. If this time should exceed 16⅔ milliseconds, then the total delay period could be reduced from 100 milliseconds (6 cycles) to 83⅓ milliseconds (5 cycles). The groups of lines indicated at 26 show that the point of initiation of the timing operation may be anywhere in the cycle ahead of the line 21. Thus, by properly determining the time delay between the point at which the timing function begins to the points at which said valves 12 and 13 are actuated, the desired pressure on the electrode 3 can be caused to occur at the desired precise time with respect to time of application of the welding heat.

Figure 2:
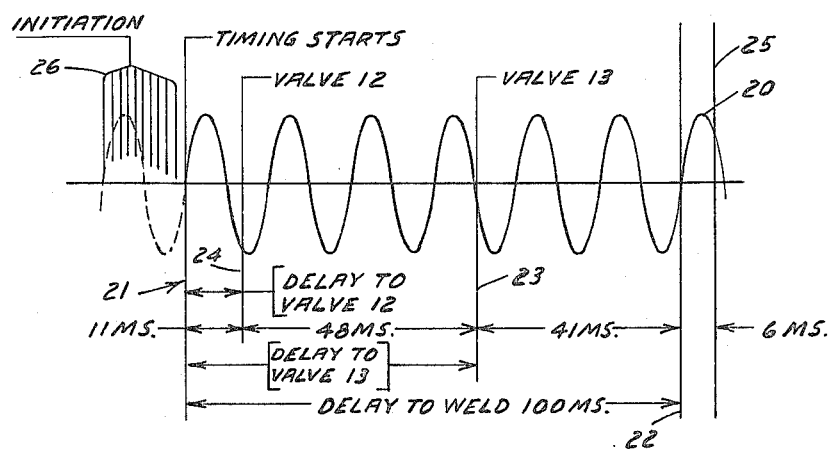
Figure 2 is a diagram illustrating the relationship of the timing functions with respect to the cycles of the A.C. source.
Figure 4:
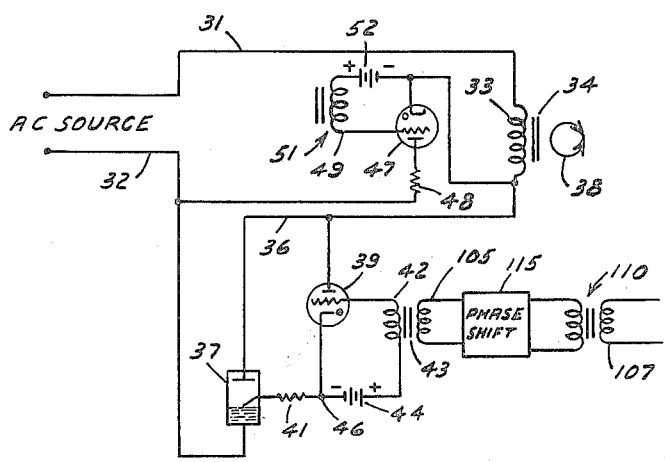
Figure 4 is a circuit diagram illustrating the circuit connections to the welding transformer.
Figure 5:
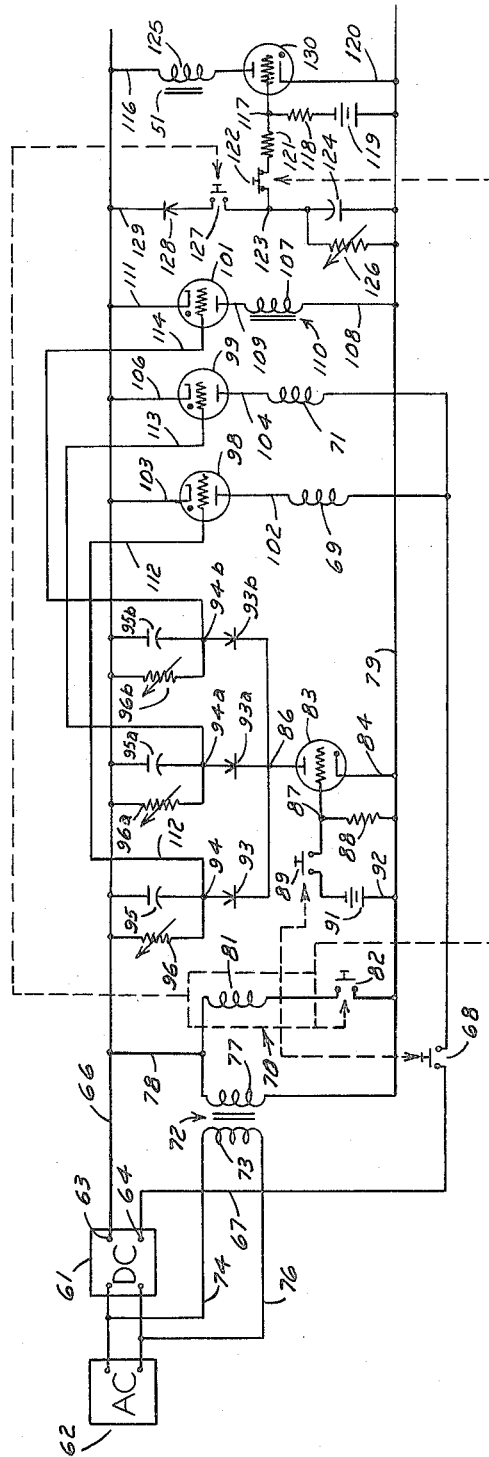
Figure 5 is a circuit diagram illustrating one specific timing circuit which may be utilized in connection with the circuit of Figure 4.

Turning now to Figures 4 and 5, there is shown suitable circuitry for carrying out the time relationships illustrated in Figure 2 and above described.

Referring first to Figure 4, there is indicated a suitable A.C. source supplying the lines 31 and 32. Line 31 is connected through the primary winding 33 of the welding transformer 34 to a conductor 36 which is in turn connected to the anode of an ignitron 37. The cathode of said ignitron is connected to the supply line 32. The secondary winding 38 of the welding transformer 34 it connected to the welding electrodes in the usual manner.

A gas-filled tube 39, as a thyratron, has its anode connected to the conductor 36 and its cathode connected through a suitable resistance 41 to the ignitor of the ignitron 37. The grid of the tube 39 is connected through the secondary winding 42 of a transformer 43 to the positive side of a source 44, as a battery, of constant potential. The negative side of the source 44 is connected to a junction point 46 located between the cathode of the tube 49 and the resistance 41.

A further gas-filled tube 47, as a thyratron, has its anode connected through a resistance 48 to the supply line 32 and has its cathode connected to the connector 36. The control electrode of said tube 47 is connected through the secondary winding 49 of a transformer 51 to the positive side of a source 52 of constant potential, such as a battery. The negative side of said source 52 is connected to the cathode of the tube 47.

Referring now to Figure 5, there is shown a schematic diagram of a circuit for use with the circuitry shown in Figure 4 and capable of carrying out the objects of the invention. In this figure there is shown a source 61 of D.C. potential, which source may be of any convenient type, such as the direct current generator or a full wave rectifier, either of which may be supplied from an A.C. source 62. Connected to the output terminals 63 and 64 of said D.C. source is a bus conductor 66 and a line 67, respectively. The line 67 is connected through the contacts 68 of the normally open relay 70, hereinafter further detailed, to the solenoid windings 69 and 71 (see also Figure 1) of the valves 12 and 13, respectively. A transformer 72 has its primary winding 73 connected by suitable conductors 74 and 76 of the A.C. source 62. The secondary winding 77 of said transformer 72 is connected at one end through a conductor 78 to the bus conductor 66 and at its other end to a bus conductor 79. The secondary winding 77 is shunted by the winding 81 of the relay 70 and the switch 82, said last two components being in series with respect to each other.

A control tube, which in this case is a thyratron 83, has its cathode connected by a conductor 84 to the bus conductor 79 and its anode is connected to a junction point 86. The control electrode of control tube 83 is connected to a junction point 87 which junction point is connected through a resistance 88 to the bus conductor 79 and is also connected through the normally opened contacts 89 of the relay 70 to the negative side of a source 91 of constant potential, such as a battery. The positive side of said source 91 is connected by a conductor 92 to the bus conductor 79.

The junction point 86 is connected to the bus conductor 66 through a plurality of parallel connected circuits, each thereof including a rectifier and a time constant circuit connected in series. More specifically, the junction point 86 is connected through a rectifier 93, which may be either the dry disk type or a suitable dipole tube, to a junction point 94. The junction point 94 is connected to the negative side of a capacitor 95 and the positive side of said capacitor is connected to the bus conductor 66. The junction point 94 is also connected through a variable resistance 96 to the bus conductor 66.

The other parallel connected circuits connecting the junction point 86 to the bus conductor 66 are indicated by numerals 93a to 96a, inclusive, and 93b to 96b, inclusive, and, since they are identical with the circuit described with the numerals 93 to 96, inclusive, they need no further description.

A plurality of electric valves, here shown as thyratrons, are indicated by the numerals 98, 99 and 101. The solenoid winding 69 of the valve 12 is connected at one end thereof to line 76 and the other end thereof is connected by the conductor 102 to the anode of the valve 98. The cathode of valve 98 is connected by the conductor 103 to the bus conductor 66. The solenoid winding 71 of the valve 13 is connected at one end thereof to line 67 and the other end thereof is connected by the conductor 104 to the anode of the valve 99. The cathode of valve 98 is connected by the conductor 106 to the bus conductor 66.

The transformer 43 (Figure 4) has a secondary winding 105 which is connected to the output terminals of a suitable phase shift circuit 115, whose nature is further described hereinafter. The input terminals of said phase shift circuit are connected to the secondary winding of a further transformer 110. One end of the primary winding 107 of transformer 110 is connected by the conductor 108 to the bus conductor 79 and the other end thereof is connected by a conductor 109 to the anode of the valve 101. The cathode of said last-named valve is connected by a conductor 111 to the bus conductor 66. The control electrodes of the valves 98, 99, and 101 are connected by conductors 112, 113 and 114, respectively, to junction points 94, 94a, and 94b, respectively.

A fifth electric valve 130, which in this embodiment is a thyratron, has its cathode connected by a conductor 120 to the bus conductor 79 and its anode is connected to one end of the primary winding 125 of the transformer 51 (see also Figure 4), the other end of which winding is connected by a conductor 116 to the bus conductor 66. The control electrode of valve 130 is connected to a junction point 117 which in turn is connected through a resistance 118 to the negative side of a source 119 of constant potential, the positive side of which is connected to the bus conductor 79. The junction point 117 is also connected through a resistance 121 and through the normally closed contacts 122 of the relay 70 to the junction point 123. The junction point 123 is connected to the positive side of a capacitor 124 and the negative side of said capacitor is connected to the bus conductor 79. A variable resistance 126 is shunted around the capacitor 124. The junction point 123 is also connected through the normally opened contacts 127 of the relay 70 to the positive side of a rectifier 128 and the negative side of said rectifier is connected by a conductor 129 to the bus conductor 66.

*Operation*

Referring first to Figure 4, it will be recognized that the ignitron 37 is normally maintained non-conductive. If a pulse is applied to the primary winding of the transformer 43, then a pulse will be applied to the control electrode of the thyratron 39 and a pulse will pass therethrough and will be applied to the ignitor of ignitron 37 to cause same to fire in a precisely predetermined relationship with the pulse applied to the lines 31 and 32. Thus, by applying a suitably phase shifted pulse to the primary winding of the transformer 43, a pulse can be passed through the primary winding of the welding transformer 34 at precisely the desired time.

Inasmuch as repeated firing of the ignitron 37 will pass pulses of the same polarity through the welding transformer 34, and since this will tend to saturate the welding transformer, it is desirable to pass pulses of opposite polarity through the primary winding of the transformer 34 between such firings. The circuitry associated with the thyratron 47 is preferably also provided to provide such opposite polarity pulses. Upon energizing of the transformer 51, in a manner hereinafter described more fully, the tube 47 is caused to conduct to provide such reverse polarity pulses to thereby effect a depolarizing of the transformer in a manner discussed in more detail hereinafter.

Turning now to Figure 5 for the timing mechanism by which the apparatus operates, the circuitry will be first considered in its "at-rest" condition.

The A.C. potential provided at 62 is applied to the transformer 72. The D.C. potential is applied between the conductors 66 and 67. Due to the open contacts 89, the negative voltage of the battery 91 is not applied to the grid of the tube 83 and hence said tube is normally conductive. This permits pulses to pass through the several resistances, 96, 96a and 96b, thence through the rectifiers connected thereto and through the tube 83 to the conductor 89, thereby charging the several capacitors 95, 95a and 95b. The capacitors are charged so that the negative terminal thereof is connected to the junction points 94, 94a and 94b. Hence, negative voltage is applied to the control electrodes of the several tubes 98, 99 and 101, thereby holding said tubes non-conductive. Simultaneously, negative voltage of the battery 119 applied to the grid of the tube 130 normally holds said tube non-conductive and the open contacts at 127 prevent the charging of the capacitor 124. The open contacts at 68 prevent the application of D.C. potential to either the solenoid windings 69 or 71 or to the tubes 98 and 101.

Referring now to Figure 1, the plastic coated metal sheet S is placed on the backup plate 1. The metal tab T is then placed in position on the metal sheet and the electrodes are placed in contact with the sheet S and tab T as shown in Figure 1.

Upon closing the initiation switch 82, which may be done mechanically, electronically or manually, the contacts 68 and 89 and 129 close, and the contacts 122 open. Closing of contacts 68 makes available D.C. potential for energizing the solenoid windings 69 and 71 but, due to the non-conductivity of the tubes 98 and 99, said solenoid windings are not yet energized. The closing of the contacts 89 applies the negative potential of the source 91 to the control electrode of the thyratron 83 and this blocks further conduction of said last-named thyratron as soon as the anode potential thereof approaches zero. Blocking of the thyratron 83 terminates the charging of the capacitors 95, 95a, and 95b and permits them to commence discharging through their parallel connected resistances and, as they successively time out, the negative voltages at the junction points 94, 94a and 94b are progressively reduced and the corresponding voltages applied to the control electrodes of the tubes 98, 99 and 101 are similarly reduced. The time relationships are selected such that the tube 98 will become conductive first and this will permit energization of the solenoid winding 69 and opening of the valve 12. Inasmuch as the energy supplied between the conductors 67 and 66 is a D.C. potential, the valve 12 will be opened immediately upon the tube 98 becoming conductive rather than awaiting the next following pulse as is the case where the A.C. potential is supplied to valve operating solenoids.

Similarly, as the time-constant circuit associated with capacitor 95a times out, the potential at the junction point 94a will diminish to a point that renders the valve 99 conductive and this energizes the solenoid winding 71 to open the valve 13.

Figure 3:
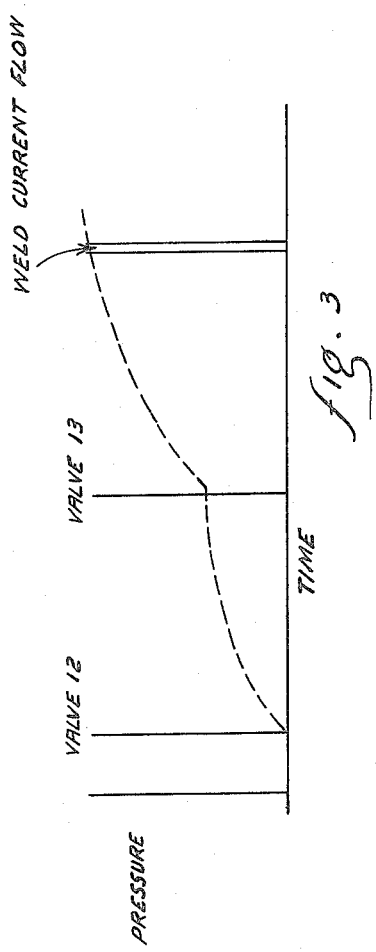
Figure 3 is a diagram illustrating the time relationship to the application of pressure to the work.

The rise in pressure applied to the electrodes by the opening of valves 12 and 13 is illustrated by the pressure versus time curve in Figure 3.

Finally, the time-constant circuit including capacitor 95b times out and the junction point 94b is reduced in potential sufficiently that the tube 101 becomes conductive. This energizes the primary winding of transformer 110 and this in turn energizes the transformer 43 after a suitable delay controlled by the setting of phase shift circuit 115. This will cause the ignitron 37 to fire to supply a pulse to the weld transformer 34 to effect the desired welding operation.

The time during which weld current flows and its relationship to the pressure on the welding electrode 3 is indicated on Figure 3.

Now turning to Figure 2 it will be readily recognized that the sequence of operations therein outlined may be easily and accurately performed by the apparatus herein described. The lines 26 represent the closing of the initiation switch 82 at any point within the cycle ending at the time indicated by the line 21. This actuates the relay 70 and closes the contacts 68 and 89, which makes available D.C. current to valve solenoids 69 and 71 and applies a negative voltage from the battery 91 to the grid of the thyratron 83 as above described. Because of known characteristics of thyratrons, the thyratron 83 will remain in conductive condition, regardless of when switch 82 is closed, until the end of the cycle and, hence, the timing operation may be considered as not commencing until, or at least in a fixed time relationship to, the beginning of the next cycle, namely, at the point of time represented by the line 21.

The timing out of the circuitry associated with the capacitor 95 is represented by the space between the lines 21 and 24 and at the time indicated by line 24, as above described, the solenoid winding 69 is energized regardless of the location of the time indicated by line 24 with respect to the A.C. wave form and the valve 12 is opened with results as above described. The pressure on electrode 3 from source 9 will reach a maximum at the time indicated by line 23. The distance from the line 24 to line 23 represents not only the additional time required for building up the pressure from source 9 but also represents the time for timing out of the circuitry associated with the capacitor 95a. When this occurs the solenoid winding 71 is energized in the manner above described and the valve 13 is opened. Again, in view of the supply of D.C. potential, the energizing of the solenoid 71 occurs at the instant the thyratron 99 is rendered conductive regardless of the condition of the A.C. cycle at this point. The period of time from the line 23 to the line 22 represents the time required for timing out of the circuitry associated with the capacitor 95b. When this occurs, the transformer 110 is energized. This energizes the secondary winding thereof to apply a pulse of the beginning of the cycle starting at the line 22 to the phase shifting circuit 115, which phase shifting circuit is arranged in any convenient or conventional manner to provide an output of not more than one cycle duration and said output may be phase shifted as desired, in this instance to provide an output of less than about 4 milliseconds duration. Thus, a pulse is applied to the transformer 43 at time indicated by line 25 in the cycle following the line 22. This acts through the transformer 43 to render the thyratron 39 conductive and thereby render the ignitron 37 conductive in a well-known manner. This provides the welding pulse commencing at a point as desired in the positive cycle indicated at 20 which pulse, as shown, is of extremely short duration and it occurs at the point when the pressure exerted onto the electrodes is approaching and is substantially at its maximum. When the weld is completed, the initiation switch 82 is opened by any convenient means either manual, mechanical or electrical, and the contacts of the relay 70 return to the position shown in Figure 5.

While the foregoing described operations following closure of switch 82 have been occurring, the relay contacts 127 are closed and the contacts 122 are open. When the contacts 122 are open a negative voltage is applied from the source 119 to the grid of the thyratron 130 and holds it non-conductive. The closing of the contacts 127 permits current to flow uni-directionally through the resistance 126 and thereby charges the capacitor 124. When the relay 70 is again de-energized at the end of a welding operation, the contacts 122 close and the contacts 127 open. The opening of the contacts 127 terminates the charging of the capacitor 124 and causes said capacitor to discharge through the resistance 126 at a rate determined by the setting of said resistance. The closing of the contacts 122 permits the positive potential on the capacitor 124 to overcome the negative potential of the source 118 and, being applied to the control electrode of the thyratron 130, renders said thyratron conductive.

When the thyratron 130 becomes conductive, the transformer 51 is energized. This renders the thyratron 47 conductive and said conduction occurs on opposite half-cycles from those providing the welding current. This provides a path of flow for reverse polarity current through the winding 33 and thereby in a known manner resets the flux of the transformer 34 to approximately a zero condition prior to the commencement of the next welding operation. As soon as the capacitor 124 drains out, the negative potential from the source 119 resumes control over the tube 130, terminating its conduction and terminating the energization of the transformer 51 which in turn terminates the conductivity of the tube 47 and the reset operation as above described ceases.

The apparatus is now ready to commence a new cycle upon the next closing of the initiation switch 82.

While a particular preferred embodiment of the invention has been described above for illustrative purposes, the invention contemplates such changes or modifications therein as lie within the scope of the appended claims.

I claim:

1. In circuitry for controlling the welding together of two fusible members, one of which is formed in part from a readily heat damageable material, comprising in combination: means initiatable at a selected reference point in time for simultaneously starting a plurality of timing means; a plurality of valves and means normally holding said valves blocked; a source of D.C. potential connected to selected ones of said valves; a source of A.C. potential connected to the remainder of said valves; means for rendering said valves conductive upon the timing out of said timing means; welding pressure applying means connected in series with said selected ones of said valves to said D.C. potential source for initiating application of welding pressure upon the rendering of said selected ones of said valves conductive regardless of the point in the cyle of said A.C. potential source at which said valves become conductive; and welding electrodes connected to said remainder of said valves and circuit means responsive to the conduction of said remainder of said valves for supplying welding current to said welding electrodes whereby weld pressure and weld current will be supplied completely independently of each other.

2. A timing circuit for controlling an operation for welding together a pair of members, at least one of which includes a readily heat damageable layer, comprising in combination: electrically responsive means for initiating the application of pressure to the members being welded; electrically responsive means for initiating flow of welding current thereto; a pair of electric valves connected for controlling said two preceding named means; a pair of timing circuits each connected respectively to said valves and means for simultaneously initiating the timing function of said timing circuits; a source of alternating potential and a source of constant potential; means connecting said source of alternating potential to the means initiating said timing function and further means for connecting said source of alternating potential to the means initiating the flow of welding current; means connecting the source of constant potential to the means for initiating the application of pressure to the members; means responsive to the completion of the timing function of said timing circuits for causing said valves to respectively initiate operation of said pressure applying means and said weld current supply means in sequence but independently of each other, whereby the pressure applying function and the welding function may each be initiated in predetermined relationship to the cycles of alternating potential but the application of pressure to the workpieces may be initiated at any point at which the timing function associated therewith times out regardless of its relationship to the pulses of alternating potential and the flow of weld current will occur independently of the application of pressure.

3. A timing circuit for controlling an operation for welding together a pair of members, at least one of which includes a readily heat damageable layer spaced only slightly from the point of welding, comprising in combination; a source of alternating potential and a source of constant potential; a first bus conductor connected to one terminal of said constant potential source and a second bus conductor connected to the other terminal of said constant potential source; a conductor connecting said first bus conductor to one side of said alternating potential source and a third bus conductor connected to the other side of said alternating potential source; a relay having its winding connected across the alternating potential source; an initiating switch in series with said winding; a plurality of timing circuits connected in parallel with respect to each other; a first electrical valve connected in series with said timing circuits, said timing circuits and said valve being connected between said first bus conductor and said third bus conductor; said timing circuits each including capacitive members and said valve being sensed to effect a negative charge between each of said capacitive members and said valve; means for blocking the conductivity of said valve and a normally open set of contacts of said relay serially connected thereto, whereby said valve is conductive excepting when said relay is energized; a fluid pressure valve operating coil and a second electric valve serially connected therewith, said coil and said second electric valve being connected between said first bus conductor and said second bus conductor; a transformer winding and a third electric valve serially connected therewith, said transformer winding and said third valve being connected between said first bus conductor and said third bus conductor; means applying the negative potential from said timing circuits, respectively, to said second and said third valves for holding said valves normally non-conductive; whereby upon closing of said initiating switch, said coil and said transformer are deenergized and will become energized only at predeterminable intervals after the closing of the initiation switch, said coil being energized immediately upon the valve connected thereto becoming conductive regardless of the relationship of the alternating potential with respect thereto and said transformer winding becoming energized during the first half-cycle following the point in time at which the valve connected thereto becomes conductive; and means responsive to energization of said coil and said transformer winding, respectively, for applying pressure to the welding electrodes and for initiating flow of welding current therebetween.

4. A timing circuit for controlling an operation for welding together a pair of members, at least one of which includes a readily heat damageable layer spaced only slightly from the point of welding, comprising in combination: a source of alternating potential and a source of constant potential; a first electric valve connected for energization by said constant potential source and fluid pressure valve operating means in series therewith for energization in response to conduction thereof; means responsive to energization of said valve operating means for applying pressure to the welding electrodes; a second electric valve connected for energization by said alternating potential source and weld current supply means in series therewith for energization in response to conduction thereof, means responsive to energization of said weld current supply means for causing flow of welding current through the welding electrodes; a normally conductive third electric valve connected to said alternating source; a pair of resistance-capacitance timing networks connected to said third valve so that the capacitors thereof are normally charged and means connecting the negative sides of said capacitors, respectively, to said first and second valves so that same are normally non-conductive; switch means for connecting said third valve to a source of negative potential to render same non-conductive to cause said timing networks to begin their timing function and for simultaneously connecting said first and second valves to the constant potential source and alternating potential source, respectively, so that said first and second valves are rendered conductive as soon as said timing networks complete their respective timing functions whereupon said pressure applying means is energized immediately when said first valve becomes conductive and weld current commences to flow during the half cycle of the alternating potential source following conduction of said second valve and operates independently of said pressure applying means.

5. A timing circuit according to claim 4 wherein said means for causing flow of welding current includes a welding transformer; an alternating current source; a fourth electric valve containing an ionizable medium for connecting said last-named source to said welding transformer to supply unidirectional potential thereto when said fourth valve is conductive; a phase shift circuit responsive to energization of said weld current supply means for rendering said fourth valve conductive; a fifth valve connected to said first-named alternating potential source; a sixth valve connected for supplying unidirectional potential of opposite polarity to said welding transformer; means for rendering said fifth valve conductive a predetermined time after weld current has ceased to flow; and means for rendering said sixth valve conductive in response to conduction of said fifth valve.

References Cited in the file of this patent

UNITED STATES PATENTS

| | | |
|---|---|---|
| 2,021,173 | Clark | Nov. 19, 1935 |
| 2,087,530 | Potchen | July 20, 1937 |
| 2,113,664 | Simmie | Apr. 12, 1938 |
| 2,120,565 | Lord et al. | June 14, 1938 |
| 2,151,753 | Etzrodt | Mar. 28, 1939 |
| 2,224,733 | Konig et al. | Dec. 10, 1940 |
| 2,315,916 | Whiteley et al. | Apr. 6, 1943 |
| 2,383,695 | Thacker | Aug. 28, 1945 |